Feb. 26, 1963 W. E. ROWE 3,079,254

PHOTOGRAPHIC FABRICATION OF SEMICONDUCTOR DEVICES

Filed Jan. 26, 1959

*INVENTOR.*
WILLIAM E. ROWE
*BY*
KENWAY, JENNEY, WITTER & HILDRETH
ATTORNEYS

United States Patent Office 3,079,254
Patented Feb. 26, 1963

3,079,254

PHOTOGRAPHIC FABRICATION OF SEMICONDUCTOR DEVICES

William E. Rowe, Newburyport, Mass., assignor of twenty-five percent to George W. Crowley, Beverly, Mass.

Filed Jan. 26, 1959, Ser. No. 789,090
3 Claims. (Cl. 96—36)

This invention relates in general to the fabrication of semiconductor devices and in particular to semiconductor devices produced by photographic processes.

In recent years there has been a pronounced trend toward miniaturization of components for electrical applications. This is especially true in the case of semiconductor devices. For numerous reasons, perhaps the most compelling of which is operability at extremely high frequencies, smaller and smaller units are constantly being developed. Inevitably, the problems of controlling the parts which go into these units have multiplied. Not only must the parts be controlled in size and in position relative to each other, but suitable leads must be placed in firm contact with the parts and brought out of the devices to provide means for utilizing the devices in circuit applications.

It is with all these problems, part size, part disposition and connection of suitable leads to parts in semiconductor devices that the present invention is concerned. The solution to these problems offered by the present invention is photographic in nature, and the precision and adaptability of such photographic techniques permit the construction of devices of a quality previously deemed unattainable.

As may be inferred from the foregoing statements, present practices are undesirable in many respects inasmuch as they are not adaptable to the production of semiconductor devices of the type and quality desired. Even in the relatively simple case of constructing semiconductor diodes, it is necessary to fuse a metallic pellet to a semiconductor die. This operation demands considerable accuracy and it is presently the practice to utilize carbon boats and, in some instances, pre-oxidized stainless steel jigs and fixtures to hold the parts in proper position as the fusing operation is carried out in a furnace. If it is then desired to form a mesa or raised area above the semiconductor die, the assembly is subjected to a random etching step in which the die is eaten away about the junction. Fnally, a lead is brought into contact with the pellet and held in place often only by pressure.

Where it is necessary to actually connect a lead to the pellet, the approach in the simple diode and even in more complicated multi-element units has been conventional. Leads have been soldered or alloyed to the elements of the semiconductor device. This is most unsatisfactory because both techniques involve a liquid phase with concomitant problems of wetting, chemical contamination and alloy depth control.

More recently, to avoid simple but unreliable pressure contacts and the difficulties of soldering and alloying, a thermo-compressive bonding technique has been attempted in the attachment of leads to semiconductor device elements. This process involves the use of pressures ranging from 5 to 10 thousand p.s.i. and temperatures of the order of 300° C. As a result of these extreme conditions, the relatively brittle germanium or silicon elements have often been crushed, destroying the junction on which the devices depend for their operation. Too, after completion of the bonding operation, a cleaning of the bonded surfaces must be undertaken. Most important, the application of a wedge, such as is used, to a wire of 4 ten-thousandths of an inch diameter to bond that wire to a minute spot of metal which may be as small as one-thousandth of an inch borders upon the impossible outside a laboratory.

It is, therefore, a primary object of the present invention to produce high-quality semiconductor devices.

It is a further object of the present invention to fabricate semiconductor devices by photographic methods which avoid the problems of present practices of soldering, alloying and the like.

It is a still further object to stabilize the quality of semiconductor devices at a consistently high level.

Another object of the present invention is to provide a method of fabrication of semiconductor devices which is easily adaptable to mass production.

Still another object is the reduction of cost of production of semiconductor devices of precise characteristics and top performance.

In general, the foregoing objects are achieved by initially preparing a wafer of semiconductor material and fusing a layer of metal such as one of the precious metals to one side of the wafer. This initial step follows conventional practice in semiconductor manufacture, as does the following step wherein a layer of a second metal, such as aluminum is alloyed to the other side of the wafer.

After the second metal is alloyed to the wafer, it is coated with a photo-resist layer by spraying or dip coating. A photographic stencil is then placed in contact with the coated second metallic surface. The stencil is made up with multiple images properly spaced and dimensioned to permit any desired number of units conforming to the images ultimately to be cut from the wafer. The images may, if integral leads are desired, include extensions from the basic dot element in spiral or other configurations. An image of the stencil is then formed on the photo-resist layer by exposing the layer to light passing through the stencil. Subsequently, the unhardened remainder of the resist is developed away leaving the second metal exposed except in the areas of the images. The second metal is then etched away with a sutiable solvent, leaving a series of images formed of the second metal on the surface of the semiconductor wafer corresponding to the images formed by the stencil.

Finally, a selective acid etch is utilized to remove the semiconductor material surrounding the images without disturbing those images, leaving islands and extensions from the islands in those instances where extensions are desired. The major portion of each island is slightly undercut by the acid etch, and the extensions are completely undercut. The extensions are then free to be lifted from the body of the wafer to serve as leads for the second metal elements.

The final fabricating operation is the so-called dicing of the wafer in which the wafer is cut into separate units. Standard cleaning procedures may then be used. For a better understanding of the present invention together with other and further objects, features and advantages, reference should be made to the following description of a preferred embodiment thereof together with the attached drawings in which.

Figure 1:
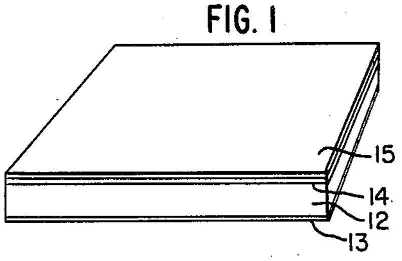
FIG. 1 is a perspective view of a composite wafer coated with photo-resist.

FIG. 1 illustrates a section of a semiconductor wafer in which the semiconductor element 12 is shown, having a gold or other suitable layer 13 fused to its lower surface. On the upper surface of the semiconductor element 12 there is alloyed a second layer 14 of aluminum or other suitable metal. To this point the water has been prepared by known and conventional methods. Following the preliminary preparation of the wafer, however, a layer of photo-resist 15 is applied to the aluminum layer 14. The photo-resist used may be that made by the Eastman Kodak Company and sold under the trade name Kodak Process Resist, or that made by the Pitman Company and sold under the trade name Pitman Hot Top, or other comparable photo-resist material.

The layer of photo-resist material may be applied by a simple spraying process or the wafer may be dipped in the material to provide the desired layer on the aluminum. In applying the layer, care must be taken to prevent excessive light from striking the photo-resist material lest it become hardened. In carrying out the process, the photo-resist material may be maintained at room temperature, and the layer should be kept as thin as possible to avoid prolongation of subsequent process steps which can be detrimental to precise results. However, in some cases layers of photo-resist as thick as two-thousandths of an inch can be tolerated.

Figure 2:
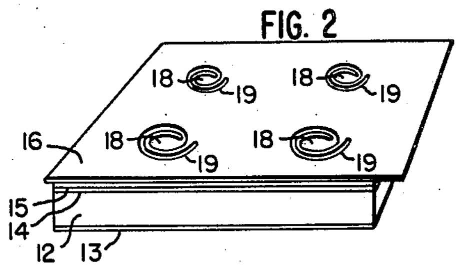
FIG. 2 is a perspective view of the wafer with a stencil placed thereon.

A photographic stencil 16 is shown in FIG. 2 placed in contact with the layer of photo-resist 15. Any desired pattern may be formed in the photographic stencil in a conventional manner, for example, by photographic reduction of a large drawing. Multiple images of the type illustrated may conveniently be formed with a step-and-repeat camera. Alternatively, more precise images may be obtanied by forming the original pattern by means of a ruling machine, again followed by the use of a step-and-repeat camera to form multiple images. If it were desired to form only simple metallic elements upon the semiconductor layer, the stencil would include only the roughly circular sections 18. If, on the other hand, it is desired to provide leads extending from the elements to be formed, extensions 19 would be cut into the stencil in communication with the basic elements 18.

For purposes which are outlined in greater detail hereinbelow, configurations other than the spirals shown may be cut into the stencil. Similarly if major elements other than circular are desired in the final product, the images of the central elements 18 may be rectangular, polygonal or of any other desired configuration, any of which may be cut into the stencil by conventional techniques. In FIG. 2 the basic semiconductor wafer 12, the underlying metallic layer 13, and the overlying metallic layer 14 are identical to those illustrated in FIG. 1.

The composite wafer with the stencil firmly in contact with the layer of photo-resist is then exposed to light. A relative bright light is preferred, and this may be obtained from an arc light or other suitable point source. In a typical arrangement, the wafer with attached stencil is placed at a distance of about 3 feet from a 30 amp. arc light. The exposure is continued for a period of about 4 minutes. The various parameters of spacing, time, and light output may be varied to a considerable degree, the only controlling factor being the necessity of hardening the photo-resist to a degree where it is firmly bonded to the metallic layer. Over-exposure should be avoided, however, to maintain proper size of images. The entire wafer is then developed by the relatively simple expedient of washing with arm water, xyol, or other suitable solvent for the particular resist used. All portions of the photo-resist which have not been exposed to light are then developed or washed away.

Figure 3:
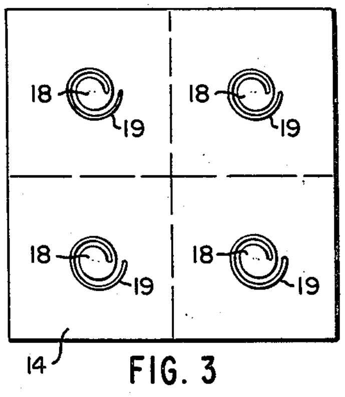
FIG. 3 is a top view of a wafer upon which images have been formed.
Figure 4:
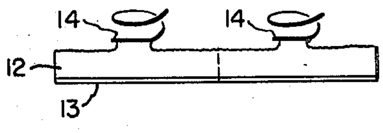
FIG. 4 is a sectional view of a wafer after the final etching.

In FIG. 3, there is illustrated the top surface of the wafer after the developing step. A plurality of light-hardened photo-resist images corresponding to the negative images of the photographic stencil are then left on the second metal surface. Actually, islands of photo-resist conforming in outline to the openings in the stencil are found on that top surface. The island areas hardened by light exposure are not removed during development because they become bonded to the second metal surface during the hardening exposure.

The entire upper surface of the wafer is then subjected to an etching process utilizing, for an aluminium layer, a solution of iron chloride, hydrochloric acid or caustic. In the case of iron chloride, a saturated solution of 35–45° Baumé is used; and in the case of hydrochloric acid or caustic, approximately a 50% solution is suitable. Typically, with a 50% solution of hydrochloric acid, the etching is permitted to take place for a period of about 5 seconds. The etching solution attacks the areas of the second metallic layer 14 which are unprotected by the photo-resist. All of the metal is permitted to be removed from the layer of semiconductor material 12 except in the areas protected by the photo-resist. Although only four units are illustrated in FIG. 3, it will be understood that any reasonable number of units could be processed simultaneously.

The etching solution undercuts portions of the metal layer 14 under the photo-resist only slightly and attacks the semiconductor layer 12 to some small extent. The result is the formation of a plurality of protuberances or individual islands 14*a* of the layer of metal 14 disposed upon the semiconductor layer 12. Integral with the individual islands 14*a* are leads or extensions 14*b*.

Following the initial etching step, the surface is rinsed and then a second etch is conducted, preferably with a hydrofluoric acid which does not attack the second metal, but which vigorously attacks the semiconductor material. In this selective etching step, the second metal acts as a resist, preventing the hydrofluoric solution from attacking semiconductor material directly under the islands 14*a*.

Various hydrofluoric acid solutions may be used for the second or selective etch for undercutting the semiconductor element 12 beneath the integral leads 14*b*. By way of example, depending upon the type of surface desired to remain after the etching takes places, any one of the three following solutions may be utilized:

I

| | Cc. |
|---|---|
| Conc. $HNO_3$ | 250 |
| Conc. HF | 150 |
| Glacial-acetic acid | 150 |
| Bromide | 3 |

II

| | Volumes |
|---|---|
| 3% $H_2O_2$ | 1 |
| Conc. HF | 1 |
| $H_2O$ | 4 |

III

| | Cc. |
|---|---|
| Conc. $HNO_3$ | 20 |
| Conc. HF | 40 |
| $H_2O$ containing 2 g. $AgNO_3$ | 40 |

Relatively rapid dissolving of the semiconductor layer 12 takes place and mesas are formed on the layer 12 under the metallic islands 14*a*. Some of the semiconductor material beneath the islands is also removed, but to no serious degree.

Most important, all of the semiconductor material beneath the metallic extensions is removed, usually in a matter of two or three minutes. At that point, the etching process is discontinued, and the extensions 14*b* are free of the semiconductor material, but, of course, still integral with the metallic islands 14*a*.

After the units are separated one from another by dicing with a diamond saw or by chemical separation, the extensions 14*b* serve as leads to the metallic islands 14*a*. Although a simple spiral has been illustrated, longer leads could be provided by means of a longer spiral or other configuration utilizing the techniques of the invention.

Figure 5:
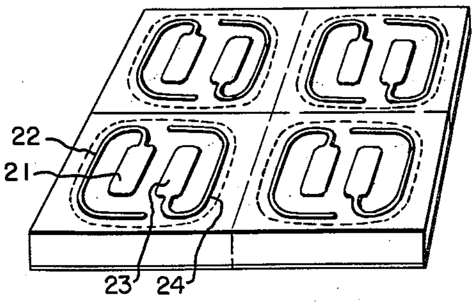
FIG. 5 is a perspective view of an alternative structure produced by the process of the present invention.

In order to illustrate only one of the many possible applications to which the process of the present invention may be put, a so-called mesa transistor is illustrated in FIG. 5. In conventional mesa transistors, it is customary to form two distinct metallic stripes upon a mesa of semiconductor material. It is necessary then to bring leads into contact with the stripes and this problem is a very difficult one indeed. The mesas themselves are tiny and fragile and the stripes are almost microscopic in size. Thus, formation of the stripes and lead attachment are processes in which the present invention is useful.

Specifically, to provide the first stripe 21 and its extension 22, a first metal is alloyed to a properly prepared semiconductor wafer. The first metal is covered with photo-resist, exposed through a stencil to form a stripe of light-hardened photo-resist of the proper size and the remaining photo-resist is washed away. Next, the first metal unprotected by photo-resist is etched away, leaving only the stripe of first metal on the semiconductor.

Following this step, the whole upper surface, including the stripe 21 and its extension 22 if necessary, is covered by a suitable process such as evaporation thereon of a second metal. Again utilizing the photo-resist technique, a stripe 23 of the second metal and extension 24 are formed on the semiconductor. Depending upon the temperatures needed for allyong the second metal, the second metal or both metals if desired can now be alloyed to the semi-conductor.

At this juncture, conventional techniques can be employed to form a high mesa on which the stripes and extensions will be disposed. It is customary to evaporate sulphur onto the mesa top surface and then to etch away surrounding material with hydrofluoric acid as is indicated by the dotted circles of FIG. 5.

After this operation is completed, the removal of semiconductor material from under the extensions 22 and 24 to free them from the body of the mesa of semiconductor may be carried out, the metals of the stripes themselves acting as a resist in this selective etching step. Clearly here, as in the diode fabrication, larger leads may be provided by simply lengthening the extensions in spiral or other suitable configurations, preserving the minimum width to obtain complete undercutting, however.

Any desired configuration either of elements or of extensions may be established, of course, in the original cutting of the photographic stencil. The art of preparing such photographic stencils is at a point of development where it is obvious that an infinite variety of configurations may easily be made by well-known techniques such as those suggested hereinabove. These configurations are then transferable to the semiconductor surface and, thus, it may be seen that the present invention should not be limited to any particular semiconductor device or devices such as those illustrated. On the contrary, an infinite variety of devices is feasible, depending only upon the cutting of suitable stencils. The invention should be limited only by the spirit and scope of the appended claims.

What is claimed is:

1. In the manufacture of a semiconductor device including a body of semiconductive material having a first metallic layer bonded to one surface thereof, the steps including applying a first coating of photosensitive resist material over said first metallic layer, masking a prescribed region of said first coating in the negative of a first contact and lead assembly including an area contact and an elongated lead integral therewith, exposing said first coating to a light source to harden the unmasked regions of said first coating corresponding to said first contact and lead assembly, removing said first coating to expose said first metallic layer in the regions corresponding to the negative of said first contact and lead assembly, etching away the exposed regions of said first metallic layer with a first etchant capable of attacking said first metallic layer to leave said first contact and lead assembly bonded to a portion of said one surface of said body, bonding a second metallic layer to an adjacent portion of said one surface, applying a second coating of photosensitive resist material over said second metallic layer, masking a prescribed region of said second coating in the negative of a second contact and lead assembly including an area contact and an elongated lead integral therewith, exposing said second coating to a light source to harden the unmasked region of said second coating corresponding to said second contact and lead assembly, removing said second coating to expose said second metallic layer in the regions corresponding to the negative of said second contact and lead assembly, etching away the exposed regions of said second metallic layer with a second etchant capable of attacking said second metallic layer to leave said second contact and lead assembly bonded to said body, and etching said one surface of said body with a further etchant capable of selectively attacking said semiconductive material for a period sufficient to completely undercut and free said first and second elongated leads from said body but insufficient to appreciably undercut said first and second area contacts such that said first and second area contacts remain bonded to said body.

2. In the manufacture of a semiconductor device including a body of semiconductive material having a first metallic layer bonded to one surface thereof, the steps including applying a first coating of photosensitive resist material over said first metallic layer, masking a prescribed region of said first coating in the negative of a first contact and lead assembly including an area contact and an elongated spiral lead integral therewith, exposing said first coating to a light source to harden the unmasked regions of said first coating corresponding to said first contact and lead assembly, removing said first coating to expose said first metallic layer in the regions corresponding to the negative of said first contact and lead assembly, etching away the exposed regions of said first metallic layer with a first etchant capable of attacking said first metallic layer to leave said first contact and lead assembly bonded to a portion of said one surface of said body, bonding a second metallic layer to an adjacent portion of said one surface, applying a second coating of photosensitive resist material over said second metallic layer, masking a prescribed region of said second coating in the negative of a second contact and lead assembly including an area contact and an elongated spiral lead integral therewith, exposing said second coating to a light source to harden the unmasked region of said second coating corresponding to said second contact and lead assembly, removing said second coating to expose said second metallic layer in the regions corresponding to the negative of said second contact and lead assembly, etching away the exposed regions of said second metallic layer with a second etchant capable of attacking said second metallic layer to leave said second contact and lead assembly bonded to said body, and etching said one surface of said body with a further etchant capable of selectively attacking said semiconductive material for a period sufficient to completely undercut and free said first and second elongated leads from said body but insufficient to appreciably undercut said first and second area contacts such that said first and second area contacts remain bonded to said body, said first and second area contacts serving to mask said body in the region immediately therebeneath to preclude substantial attack of said region such that said semiconductor body is formed with a raised island having said first and second area contacts bonded thereto and said first and second spiral leads projecting from the respective area contacts and freed from said body.

3. In the manufacture of a semiconductor device including a body of semiconductive material having a first metallic layer bonded to one surface thereof, the steps including applying a first coating of photosensitive resist material over said first metallic layer, masking a prescribed region of said first coating in the negative of a first contact and lead assembly including an area contact and an elongated spiral lead integral therewith, exposing said first coating to a light source to harden the unmasked regions of said first coating corresponding to said first contact and lead assembly, removing said first coating to expose said first metallic layer in the regions corresponding to the negative of said first contact and lead assembly, etching away the exposed regions of said first metallic layer with a first etchant capable of attacking said first metallic layer to leave said first contact and lead assembly bonded to a portion of said one surface of said body, bonding a second metallic layer of a metal different from said first metallic layer to an adjacent portion of said one surface, applying a second coating of photosensitive resist material over said second metallic layer, masking a prescribed region of said second coating in the negative of a second contact and lead assembly including an area contact and an elongated spiral lead integral therewith, exposing said second coating to a light source to harden the unmasked region of said second coating corresponding to said second contact and lead assembly, removing said second coating to expose said second metallic layer in the regions corresponding to the negative of said second contact and lead assembly, etching away the exposed regions of said second metallic layer with a second etchant capable of attacking said second metallic layer to leave said second contact and lead assembly bonded to said body, and etching said one surface of said body with a further etchant capable of selectively attacking said semiconductive material for a period sufficient to completely undercut and free said first and second elongated leads from said body but insufficient to appreciably undercut said first and second area contacts such that said first and second area contacts remain bonded to said body, said first and second area contacts serving to mask said body in the region immediately therebeneath to preclude substantial attack of said region such that said semiconductor body is formed with a raised island having said first and second area contacts bonded thereto and said first and second spiral leads projecting from the respective area contacts and freed from said body.

References Cited in the file of this patent

UNITED STATES PATENTS

| | | |
|---|---|---|
| 2,587,568 | Eisler | Feb. 26, 1952 |
| 2,780,569 | Hawlett | Feb. 5, 1957 |
| 2,829,460 | Golay | Apr. 8, 1958 |
| 2,849,298 | Werberig | Aug. 26, 1958 |
| 2,910,634 | Rutz | Oct. 27, 1959 |
| 2,911,706 | Wertwijn | Nov. 10, 1959 |